US009118596B2

(12) United States Patent
Kashyap

(10) Patent No.: US 9,118,596 B2
(45) Date of Patent: Aug. 25, 2015

(54) REDUCING FRAGMENTATION OF PACKETS IN A NETWORKING ENVIRONMENT

(71) Applicant: LENOVO ENTERPRISE SOLUTIONS (SINGAPORE) PTE. LTD, Singapore (SG)

(72) Inventor: Vivek Kashyap, Portland, OR (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 13/779,744

(22) Filed: Feb. 28, 2013

(65) Prior Publication Data

US 2014/0241144 A1 Aug. 28, 2014

(51) Int. Cl.
*H04J 1/16* (2006.01)
*H04L 12/805* (2013.01)

(52) U.S. Cl.
CPC .................................. *H04L 47/365* (2013.01)

(58) Field of Classification Search
CPC ... H04L 47/365; H04L 12/4633; H04L 43/10; H04L 47/36; H04L 63/0272; H04L 12/4641; H04L 47/10; H04L 63/0428; H04L 63/164; H04L 63/029; H04L 1/1854; H04L 41/0806; H04L 41/0893; H04L 43/0817; H04L 45/30; H04L 47/2416; H04L 47/2433; H04L 47/2475; H04L 63/0236; H04L 63/061; H04L 63/062; H04L 63/126; H04L 63/166; H04L 67/14; H04L 67/141; H04L 69/16; H04W 76/022; H04W 28/06
USPC .......... 370/216, 470, 392, 401, 389, 390, 466
See application file for complete search history.

(56) References Cited

U.S. PATENT DOCUMENTS

| 5,892,753 | A | 4/1999 | Badt et al. | |
|---|---|---|---|---|
| 7,697,524 | B2 | 4/2010 | Subramanian et al. | |
| 8,073,979 | B2 | 12/2011 | Kinsey et al. | |
| 8,265,079 | B2 | 9/2012 | Baratakke et al. | |
| 2003/0076850 | A1* | 4/2003 | Jason, Jr. ...................... | 370/414 |
| 2010/0131669 | A1* | 5/2010 | Srinivas et al. ............... | 709/233 |

(Continued)

OTHER PUBLICATIONS

Tsugawa, "On the Design, Performance, and Management of Networks for Grid Computing," Dissertation, Univ. of Florida, 2009.

*Primary Examiner* — Charles C Jiang
*Assistant Examiner* — Rose Clark
(74) *Attorney, Agent, or Firm* — Edward J. Lenart; Katherine S. Brown; Kennedy Lenart Spraggins LLP

(57) ABSTRACT

Automated techniques reduce packet fragmentation in a communications network environment, including a networking environment that uses tunnels. In a tunneling environment, a tunnel endpoint evaluates whether tunnel processing for an outbound packet will cause the packet to exceed a particular size such as a message transmission unit ("MTU") size, which in turn would lead to error processing and/or fragmentation of the packet. Similar MTU and packet mismatch may occur in a system across the virtual machine and the hypervisor, a networking stack and the physical MTU possible on the network. If so, the tunnel endpoint or the network driver simulates an error condition and returns an error message to the protocol stack that prepared the packet, so that the packet size can be reduced before the packet is actually sent on the tunnel. Existing functionality is leveraged to perform the size reduction, thus obviating the need for administrator intervention.

16 Claims, 8 Drawing Sheets

(56) References Cited

U.S. PATENT DOCUMENTS

| | | |
|---|---|---|
| 2010/0183009 A1 | 7/2010 | Baratakke et al. |
| 2011/0103399 A1* | 5/2011 | Bransi et al. ................. 370/470 |
| 2011/0173295 A1* | 7/2011 | Bakke et al. ................. 709/217 |
| 2011/0222557 A1 | 9/2011 | Starks et al. |
| 2011/0274108 A1 | 11/2011 | Fan |
| 2011/0276699 A1 | 11/2011 | Pedersen |
| 2011/0321039 A1 | 12/2011 | De Leon, III et al. |
| 2012/0281706 A1* | 11/2012 | Agarwal et al. .......... 370/395.53 |
| 2014/0108665 A1* | 4/2014 | Arora et al. ................. 709/227 |

\* cited by examiner

FIG. 7
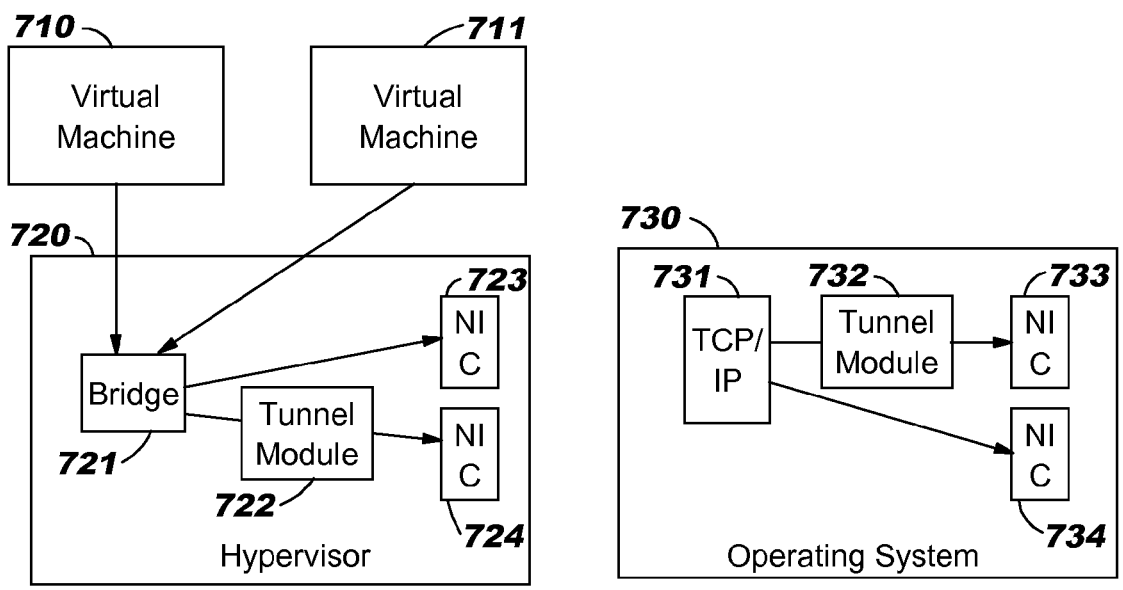
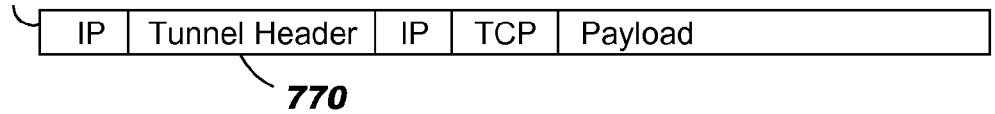

REDUCING FRAGMENTATION OF PACKETS IN A NETWORKING ENVIRONMENT

BACKGROUND OF THE INVENTION

The present invention relates to computer programming and communications networks, and deals more particularly with reducing packet fragmentation in a networking environment (including, by way of example, a packet tunneling environment or a network overlay environment).

When application data is prepared for transmission through a communications network, various headers are added to the application data that is to be sent in an outbound message. The application data is commonly referred to as the payload. Typically, a particular layer of a network protocol stack adds its own layer-specific message header(s) to the payload, and the resulting data block is then encapsulated by the next lower layer of the protocol stack, which in turn adds its own layer-specific message header(s). This process of encapsulation and adding message headers may be repeated multiple times before a particular payload is transmitted.

A link layer in the protocol stack typically has a maximum transmission unit, or "MTU", size that represents the largest packet size (in bytes) that can be passed from this layer to the network. The MTU size includes both the payload and the headers which are present. A larger MTU size therefore allows more payload to be contained in each outbound packet, whereas a smaller MTU size may lead to an undesirable ratio of headers to payload. On the other hand, the larger packets take longer to transmit and may be more likely to be dropped during transmission, thus necessitating retransmission.

BRIEF SUMMARY OF THE INVENTION

The present invention provides automated techniques for reducing packet fragmentation in a networking environment. In one embodiment that uses tunneling, this comprises: receiving, at a tunnel endpoint of an outbound tunnel, a packet prepared for transmission to a network, wherein data values to be added by the tunnel endpoint are absent from the prepared packet; determining, by the tunnel endpoint, whether a size of the received packet exceeds a threshold, wherein the threshold accounts for the data values to be added by the tunnel endpoint, in view of a maximum packet size for packets prepared for transmission to the network; and responsive to determining that the size of the received packet exceeds the threshold, generating, by the tunnel endpoint, a simulated error condition and sending an error message to a preparer of the received packet, the error message adapted to automatically cause the preparer to reformat payload data of the packet into a smaller-sized packet and then send the smaller-sized packet to the tunnel endpoint for transmission to the network. (If the size of the received packet does not exceed the threshold, the tunnel endpoint adds the data values to the received packet to create a tunnel packet and sends the tunnel packet on the outbound tunnel for transmission through the network.) The preparer may be a protocol stack, and the tunnel endpoint may be a hypervisor in a virtualized computing environment or a tunnel module in a non-virtualized computing environment, by way of example. The maximum packet size may be a link layer MTU size. The size of the received packet may exceed the threshold due to various types of MTU size constriction on a transmission path of the packet. The error message may comprise an Internet Control Message Protocol ("ICMP") error message.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 7 illustrates tunneling in a virtualized operating system environment and in a non-virtualized operating system, along with data packets before and after encapsulation for tunneling;

DETAILED DESCRIPTION OF THE INVENTION

Figure 1:
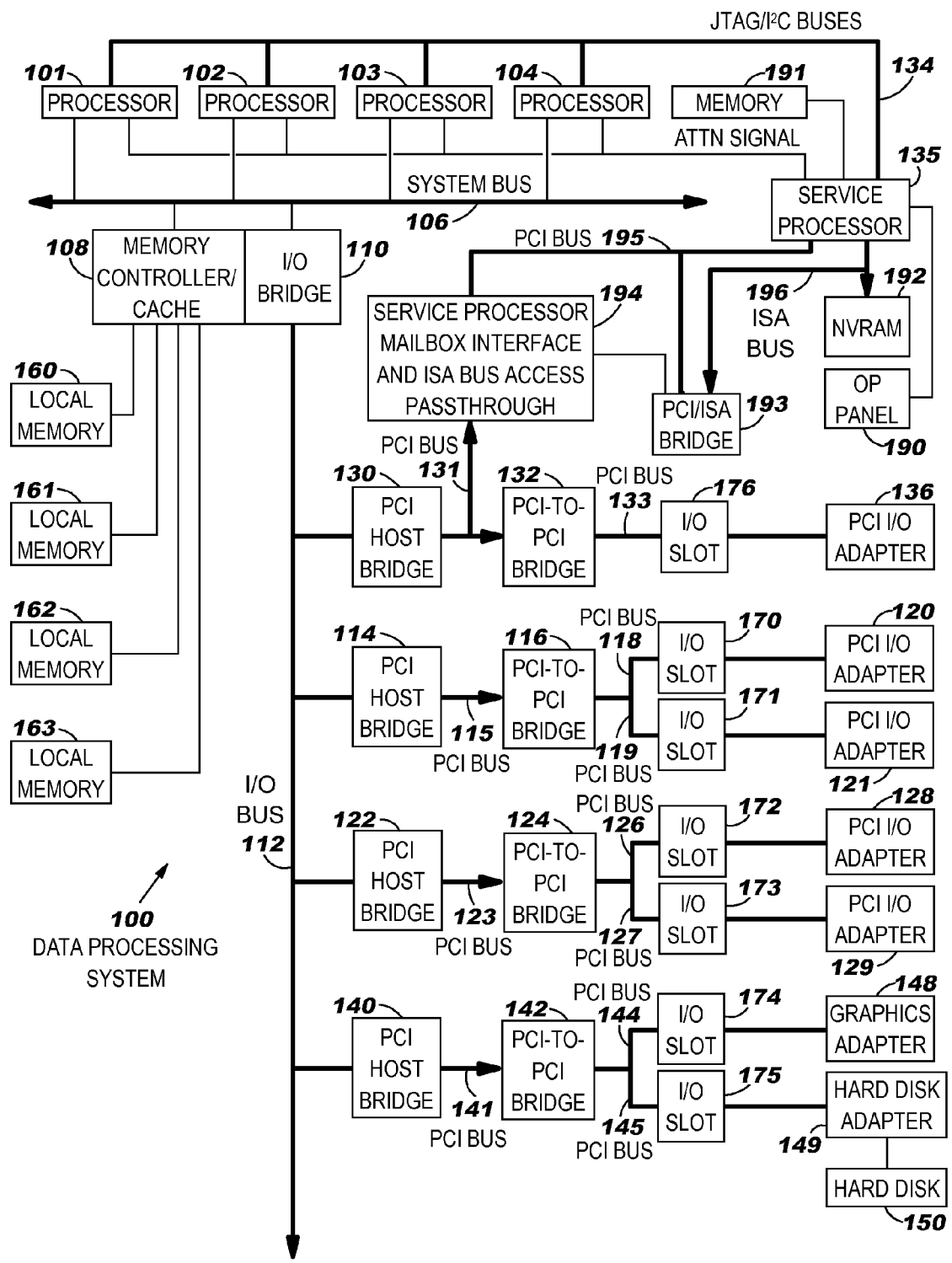
FIG. 1 is a block diagram of a data processing system in which an embodiment of the present invention may be implemented.

Embodiments of the present invention are directed toward reducing packet fragmentation and its corresponding reassembly (referred to herein simply as "fragmentation" for ease of reference) in a communications network environment that encounters MTU size constriction. By way of illustration but not of limitation, discussions herein refer primarily to MTU size constriction that occurs when using packet tunnels. When data is transmitted by a networking stack (on behalf of a TCP application, for example), it might have to be transmitted over interfaces or links that have a smaller MTU size than the packet. This causes the data to be either fragmented or dropped when using existing techniques. To avoid fragmentation and retransmission, an embodiment of the present invention notifies the source so that future packets are sent with a smaller MTU size, as will be discussed in more detail herein. In a tunneling environment, packets that have been prepared for transmission, but which require further encapsulation and headers for a tunneling protocol, are evaluated to ensure that the increased packet size which results from the tunneling protocol will not cause a too-large packet to be sent into the network.

The disclosed techniques may be particularly useful for tunneling in a virtual machine ("VM") environment, referred to equivalently herein as a virtualized environment. Embodiments are not limited to this environment, however, and discussions herein that refer to virtual machine environments should be interpreted as examples of an environment in which an embodiment of the present invention may be used. A virtualized environment is one which allows data processing resources to be pooled and shared in a way that shields the physical nature and boundaries of those resources from users. Processors may be virtualized, for example, through shared processor partitioning. An additional layer of software, or firmware, is then placed between the operating system(s) and the hardware to manage the correspondence between the virtual processors and the physical (i.e., actual) processors.

Virtualization of computing systems provides a number of benefits. As physical systems become more powerful, many resources are available for use by operating systems and applications. Typically, a physical system has more resources than any one operating system and its application program(s) need at a particular point in time. By running a single physical system as if it is multiple virtual machines, some types of system resources can be shared, thereby reducing the effective hardware cost per virtual machine.

Virtualization of computing systems also allows for portability, whereby a virtual machine can be dynamically moved from a source physical system to a destination physical system, while experiencing substantially no interruption in service. This portability feature may be useful in a number of scenarios, including (by way of illustration but not of limitation) when it is desired to perform maintenance on the source system, to upgrade hardware, to dynamically rebalance processing load across multiple physical systems, or to move logical partitions because a failure appears likely on a system on which those logical partitions are executing.

Figure 2:
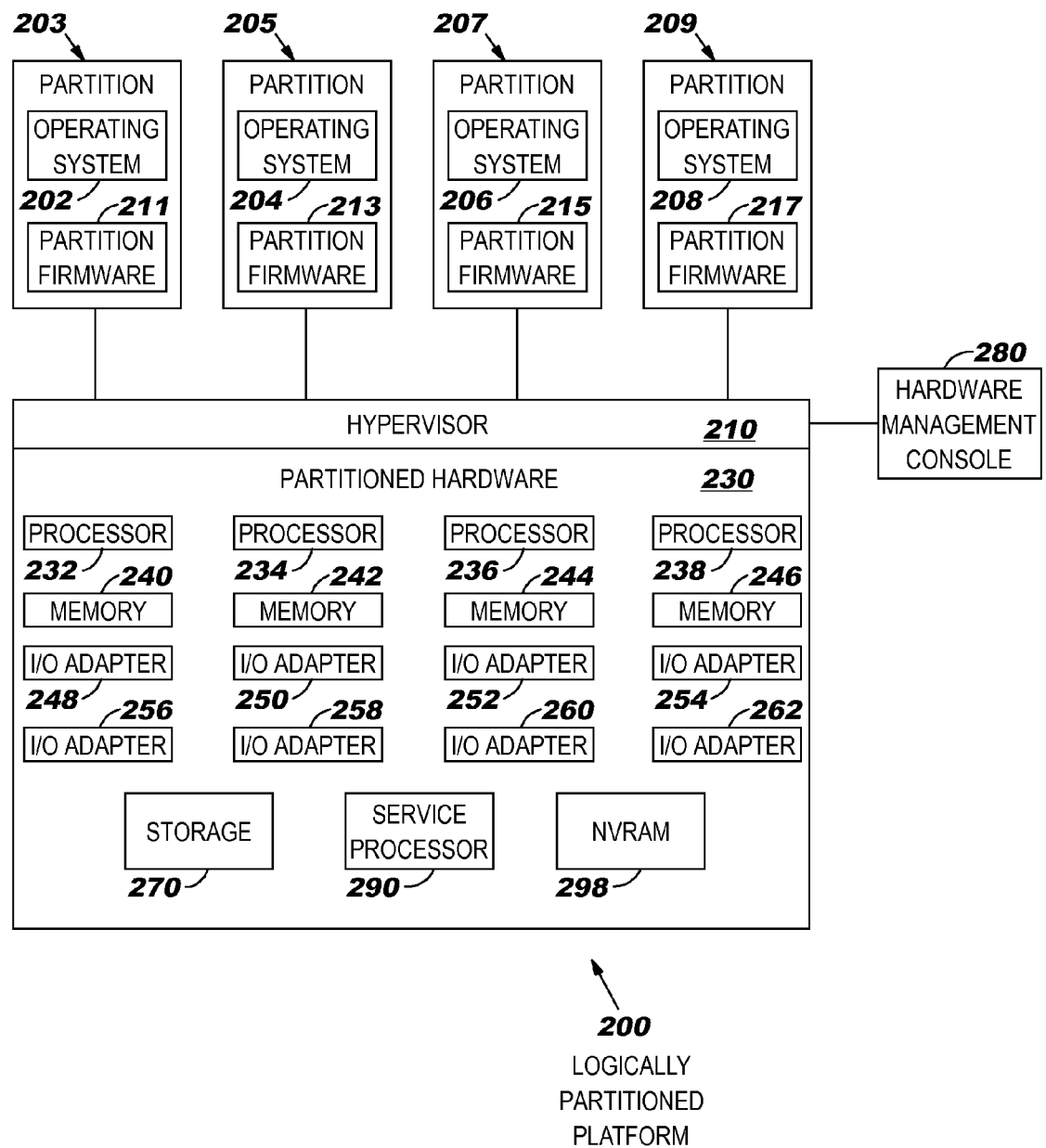
FIG. 2 is a block diagram of a logically partitioned platform of a computing environment in which an embodiment of the present invention may be implemented.
Figure 3:
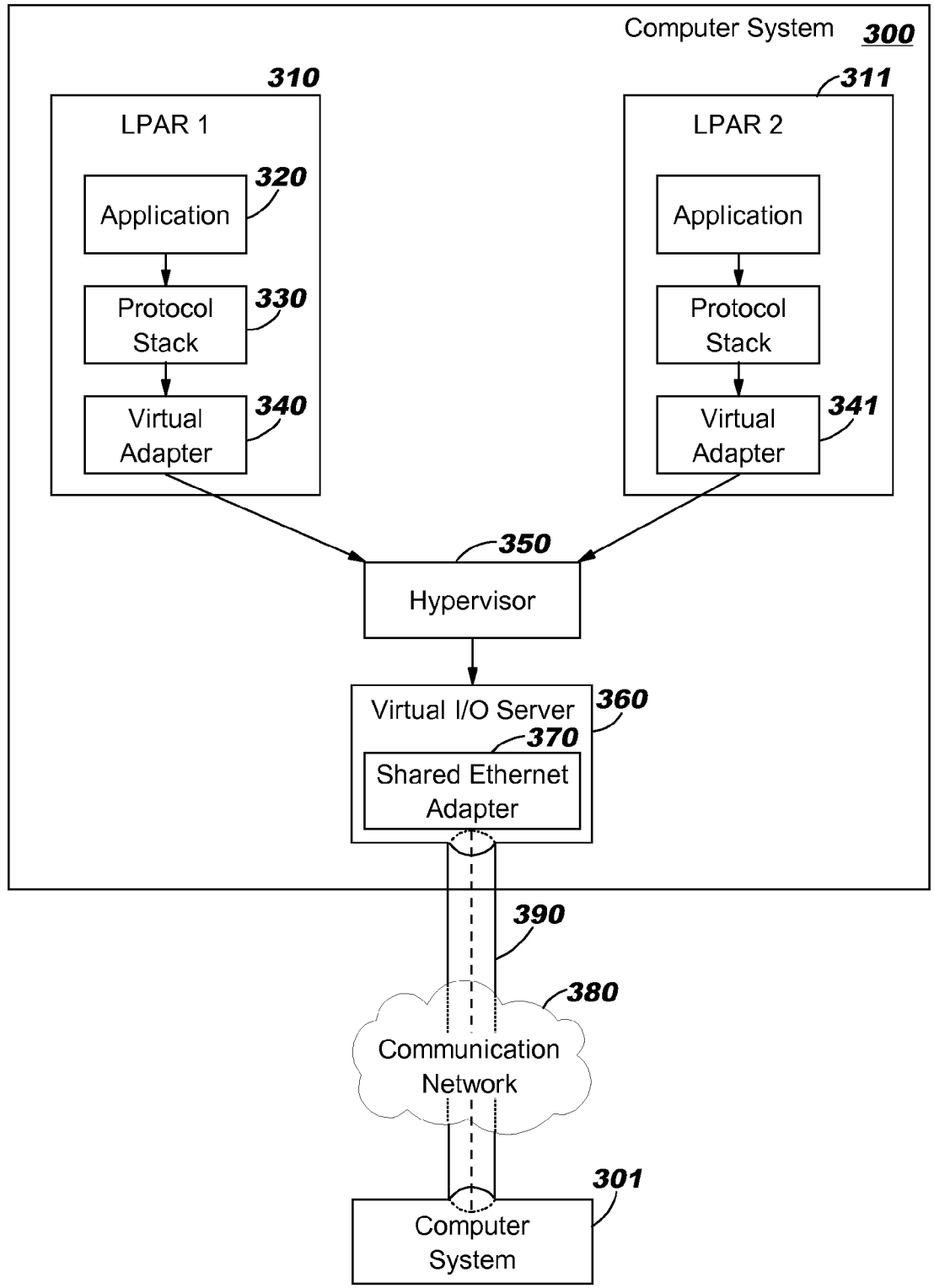
FIG. 3 is a block diagram illustrating components which may be involved when implementing an embodiment of the present invention, and further illustrates a logical tunnel for sending data packets.

Components of an illustrative data processing system using shared processor partitioning, and in which an embodiment of the present invention may be practiced, will now be discussed with reference to FIGS. 1-3. It should be noted that the example components and computing environments discussed herein with reference to FIGS. 1-3 are not intended to state or imply any limitation as to the particular types of computing environments in which an embodiment of the present invention may be implemented, and/or to the hardware or other components that may be present in such computing environments. Rather, many modifications to the depicted computing environments and/or components may be made without departing from the spirit and scope of the present invention. (Also, it should be noted that references herein to "an embodiment" do not necessarily all refer to the same embodiment.)

FIG. 1 provides a block diagram of a data processing system in which an embodiment of the present invention may be implemented. Data processing system 100 may be a symmetric multiprocessor ("SMP") system including a plurality of processors 101, 102, 103, and 104 connected to a system bus 106. For example, data processing system 100 may be an IBM eServer™ data processing system, implemented as a server within a network. ("eServer" is a trademark of International Business Machines Corporation in the United States, other countries, or both.) Alternatively, the plurality of processors may be implemented using one or more multi-core processors. As yet another alternative, a single processor system may be employed. Also connected to system bus 106 is memory controller/cache 108, which provides an interface to a plurality of local memories 160-163. An I/O bus bridge 110 is connected to system bus 106 and provides an interface to I/O bus 112. Memory controller/cache 108 and I/O bus bridge 110 may be integrated as depicted.

Data processing system 100 is a logically partitioned ("LPAR") data processing system. Thus, data processing system 100 may have multiple heterogeneous operating systems (and/or multiple instances of a single operating system) running simultaneously. Each of these multiple operating systems may have any number of software programs executing within it. The logical partitioning of data processing system 100 allows various resources (such as processors 101-104; peripheral component interconnect ("PCI") I/O adapters 120-121, 128-129, and 136; graphics adapter 148; and hard disk adapter 149) to be assigned to different logical partitions. Graphics adapter 148 may provide a connection for a display device (not shown), while hard disk adapter 149 may provide a connection to control a hard disk 150.

Suppose, for example, that data processing system 100 is divided into three logical partitions which are referred to for purposes of discussion herein as P1, P2, and P3. Each of the above-noted physical or virtual I/O devices, host processors, and local memories, or portions thereof, may be assigned to one of the three partitions. For example, at a point in time, logical partition P1 may be assigned to use processor 101, some portion of memory from local memories 160-163, and I/O adapters 120, 128, and 129. At a point in time, logical partition P2 may be assigned to use processors 102-103, some portion of memory from local memories 160-163, and PCI I/O adapters 121 and 136. At a point in time, logical partition P3 may be assigned to use processor 104, some portion of memory from local memories 160-163, graphics adapter 148, and hard disk adapter 149. Although not depicted in FIG. 1, portions of remote memories (not shown) may also be assigned to logical partitions, such as P1 or P2 in the illustrative example.

Each operating system instance executing within data processing system 100 is assigned to a different logical partition. Thus, each operating system instance executing within data processing system 100 may access only those I/O units that are within its logical partition. For example, one instance of the AIX® operating system may be executing within partition P1, a second instance (image) of the AIX® operating system may be executing within partition P2, and a Linux® operating system may be operating within logical partition P3. ("AIX" is a registered trademark of International Business Machines Corporation in the United States, other countries, or both. "Linux" is a registered trademark of Linus Torvalds in the United States, other countries, or both.)

A number of PCI host bridges are shown in FIG. 1. See, for example, reference numbers 114, 122, 130, 140. These PCI host bridges are connected to I/O bus 112, and also provide an interface to a corresponding PCI local bus (shown at reference numbers 115, 123, 131, 141). FIG. 1 also shows a number of the above-noted PCI I/O adapters (see reference numbers 120-121, 128-129, 136) being connected to a PCI bus (see reference numbers 118-119, 126-127, 133) which in turn connects to a PCI-to-PCI bridge (see reference numbers 116, 124, 132). Similarly, graphics adapter 148 and hard disk adapter 149 are shown as being connected to PCI local buses 144-145, respectively, which in turn are connected to PCI-to-PCI bridge 142. A number of I/O slots (see reference numbers 170-176) are depicted as being deployed between the adapters and PCI-to-PCI bridges, enabling the adapters to be plugged in and thus connect to the system 100.

Typical PCI bus implementations will support between four and eight I/O adapters (i.e., expansion slots for add-in connectors). Each PCI I/O adapter provides an interface between data processing system 100 and input/output devices such as, for example, various modems or network adapters. In this manner, data processing system 100 allows connections to one or more other data processing systems through a network (not shown in FIG. 1). Notably, these network connections may be used by an embodiment of the present invention to send outbound data packets from (and to receive inbound data packets for) applications executing in data processing system 100.

Additional examples of devices that may be connected to system 100 through an I/O slot include memory-mapped graphics adapter 148 and hard disk adapter 149 (which in turn provides a connection to hard disk drive 150).

In the example of data processing system 100, a PCI bus 131 provides a connection to a service processor mailbox interface and ISA bus access pass-through logic 194. Service processor mailbox interface and ISA bus access pass-through logic 194 forwards PCI accesses destined to the PCI/ISA bridge 193. Non-volatile random-access memory ("NVRAM") storage 192 is shown as being connected to the ISA bus 196. Service processor 135 is coupled to the service processor mailbox interface and ISA bus access pass-through logic 194 through its local PCI bus 195. Service processor 135 is also connected to processors 101-104 via a plurality of JTAG/I²C buses 134. JTAG/I²C buses 134 are a combination of JTAG/scan buses (see IEEE 1149.1) and Phillips I²C buses. Alternatively, system 100 might use only Phillips I²C buses or only JTAG/scan buses in place of JTAG/I²C buses 134.

All SP-ATTN signals of the host processors 101, 102, 103, and 104 are connected together to an interrupt input signal of the service processor. The service processor 135 has its own local memory 191, and has access to a hardware operations panel 190.

As data processing system 100 is initially powered up, service processor 135 may release host processors 101-104 for execution of code loaded into local memory 160-163. While host processors 101-104 are executing code from respective operating systems within data processing system 100, service processor 135 may enter a mode of monitoring and reporting errors. The type of items monitored by service processor 135 may include, for example, the cooling fan speed and operation, thermal sensors, power supply regulators, and recoverable and non-recoverable errors reported by processors 101-104, local memories 160-163, and I/O bridge 110.

Service processor 135 is generally responsible for saving and reporting error information related to all the monitored items in data processing system 100. Service processor 135 may also take action based on the type of errors and defined thresholds. For example, service processor 135 may take note of excessive recoverable errors on a processor's cache memory and decide that this is predictive of a hard failure. Based on this determination, service processor 135 may send a signal that partitions should be evacuated from the processor having the cache memory issues, and this in turn may invoke dynamic partition migration of one or more partitions.

Those of ordinary skill in the art will appreciate that data processing system 100 may be implemented using various commercially-available computer systems, and that the hardware used in such computer systems may vary widely from the examples depicted in FIG. 1. Furthermore, it will be appreciated that other peripheral devices, such as optical disk drives and the like, may be used in addition to or instead of the peripheral devices depicted in FIG. 1. As example of commercially-available computer systems that may be leveraged by an embodiment of the present invention, data processing system 100 may be implemented using IBM eServer™ i5 or eServer™ p5 server models available from International Business Machines Corporation. Such a system may support logical partitioning using an AIX® operating system or an i5/OS™ operating system which are also available from International Business Machines Corporation. ("i5/OS" is a trademark of International Business Machines Corporation in the United States, other countries, or both.)

With reference now to FIG. 2, a block diagram of an exemplary logically partitioned platform 200 is depicted, and illustrates a virtualized environment in which an embodiment of the present invention may be implemented. The hardware in logically partitioned platform 200 may be implemented as, for example, data processing system 100 in FIG. 1. Logically partitioned platform 200 includes partitioned hardware 230; operating systems 202, 204, 206, 208; and hypervisor 210. Hypervisor 210, which is discussed in more detail below, may be referred to more generally as partition management firmware. (Firmware may be considered a type of software stored in a memory chip that holds its contents without electrical power, as is readily understood by those of ordinary skill in the art.) Operating systems 202, 204, 206, and 208 may be multiple copies of a single operating system or multiple heterogeneous operating systems simultaneously running on platform 200. These operating systems may be implemented, by way of example, using the AIX® operating system, the i5/OS™ operating system, or the Linux® operating system, which are designed to interface with hypervisor 210. In the example of FIG. 2, operating systems 202, 204, 206, and 208 are located in logical partitions 203, 205, 207, and 209, respectively.

The logical partitions 203, 205, 207, 209 also include partition firmware 211, 213, 215, and 217, respectively. Partition firmware 211, 213, 215, and 217 may be implemented using initial boot strap code, IEEE-1275 Standard Open Firmware, and runtime abstraction software ("RTAS"), which is available from International Business Machines Corporation. When partitions 203, 205, 207, and 209 are instantiated, a copy of boot strap code is loaded into each partition 203, 205, 207, and 209 by the hypervisor 210. Control is then transferred to the boot strap code, which executes to load the open firmware and RTAS. The processors associated or assigned to the partitions 203, 205, 207, and 209 are then dispatched to the respective partition's memory to execute the now-loaded partition firmware 211, 213, 215, and 217.

Partitioned hardware 230 includes a plurality of processors 232-238, a plurality of system memory units 240-246, a plurality of I/O adapters 248-262, and a storage unit 270. Partitioned hardware 230 also includes service processor 290, which may be used to provide various services such as processing of platform errors in the partitions, and NVRAM storage 298. Each of the processors 232-238, memory units 240-246, NVRAM storage 298, and I/O adapters 248-262 may be assigned to one of multiple partitions 203, 205, 207, 209 within logically partitioned platform 200, where each of these partitions 203, 205, 207, 209 is executing a corresponding one of operating systems 202, 204, 206, and 208.

Hypervisor 210 performs a number of functions and services for partitions 203, 205, 207, and 209 to create and enforce the partitioning of logically partitioned platform 200. Hypervisor 210 is a firmware-implemented virtual machine, which is designed to be identical to the underlying hardware in order to interface with the partitions. Hypervisor 210 allows the simultaneous execution of independent operating system images 202, 204, 206, and 208 by virtualizing all hardware resources of logically partitioned platform 200.

More generally, the hypervisor 210 directly controls resource allocations on the platform 200 and also provides for communication between logical partitions on the platform.

Operations of the different partitions 203, 205, 207, and 209 may be controlled through a hardware management console ("HMC") 280. HMC 280 is an example of a hardware appliance that connects to the hypervisor 210, and is typically a data processor that is separate from the logically partitioned platform 200. The HMC may be used (for example, by a systems administrator) to specify to the hypervisor 210 how to allocate or reallocate resources among the logical partitions on the platform 200, start and stop the logical partitions, update server firmware code, manage capacity on demand, and transmit service information to service and support if hardware problems are detected in the platform 200. Alternatively, such functions may be provided in a different manner without deviating from the scope of the present invention. For example, Version 5 Release 3 of the above-noted i5/OS™ operating system introduced a Virtual Partition Manager feature that allows an administrator to create and manage several logical partitions from a console session.

Turning now to FIG. 3, components which may be used in an embodiment of the present invention to reduce packet fragmentation in a tunneling environment will now be discussed in more detail. Sample packets will be discussed with reference to FIG. 6, and logic which may be used when implementing an embodiment of the present invention will be discussed with reference to the flowchart in FIG. 8.

FIG. 3 depicts a computer system 300 which has, by way of example, two logical partitions 310, 311. With reference to logical partition 310, an application 320 is executing within this partition. Outbound data created by application 320 is sent through a network protocol stack 330 of the logical partition 310. (The protocol stack 330 may be referred to equivalently as the protocol stack of the virtual machine.) Network protocol stack 330 builds one or more packets from the outbound data, based on the MTU size. Each packet is sent to virtual adapter 340, which also forms part of the logical partition 310. Virtual adapters allow connections (e.g., for transfer of data) between logical partitions 310, 311 without the use of physical hardware (such as a physical Ethernet adapter). Each logical partition 310, 311 is preferably associated with a distinct virtual adapter 340, 341, as shown in FIG. 3.

Computer system 300 includes a hypervisor 350, which performs functions such as allocating resources among the logical partitions, as has been discussed above with reference to hypervisor 210 of FIG. 2.

When hypervisor 350 receives an outbound packet from the virtual adapter 340 of logical partition 310, it transmits the outbound packet to a virtual I/O server 360 of computer system 300. The virtual I/O server 360 is a logical partition that acts as a gateway for all logical partitions 310, 311 of computer system 300, and handles both inbound and outbound traffic of the computer system 300. Virtual I/O server 360 comprises resources such as a shared Ethernet adapter ("SEA") 370. SEA 370 enables transfer of data between different computer systems via a physical Ethernet adapter (not shown in FIG. 3), and thereby allows logical partitions 310, 311 to communicate with computer systems which are external to computer system 300. One such external computer system is shown at 301 of FIG. 3. A network 380 communicatively couples computer system 300 to such external computer system 301. The SEA 370 typically receives packets from the logical partitions 310, 311 (via a virtual adapter of the SEA) and transmits those packets (via the physical Ethernet adapter) on the physical network 380, thus serving as a bridge between the logical network (i.e., the virtual adapters 340, 341) and the physical network 380. The SEA thus eliminates the need for each logical partition 310, 311 to have its own physical network adapter.

FIG. 3 also shows a tunnel 390, which is a logical connection that extends from computer system 300 to computer system 301 over network 380.

As noted earlier, the packet payload size that can be transmitted to the physical network is dependent upon the MTU size supported by the link layer of the protocol stack. Furthermore, the maximum payload size a higher layer can transmit is dependent on the headers and encapsulation that will be included by lower layers of the protocol stack. By default, an MTU size of 1,500 bytes is used for Ethernet LANs. Packets of 1,500 or fewer bytes can generally traverse a network without requiring fragmentation. If a larger packet reaches a router in the network path, however, the router will generate an error message (referred to herein as a "path-MTU", "ICMP", or "packet too large" error) that is returned to the system which originally built the packet, informing that system that the packet size is too large and needs to be fragmented into smaller packets and retransmitted. ("ICMP" is an abbreviation for Internet Control Message Protocol, as is well known to those of skill in the art.) This type of packet fragmentation processing in the network is undesirable for a number of reasons. As one example, efficiency and throughput are reduced when the router discards the already-transmitted too-large packet. As another example, discarding a packet may have knock-on effects on other packets which, taken together, form a larger payload. Thus, a protocol stack that is building an outbound packet will attempt to enforce the MTU size by limiting the payload size of a particular packet at higher layers of the protocol stack, in view of the anticipated headers that will be added by the protocol stack processing.

Figure 4:
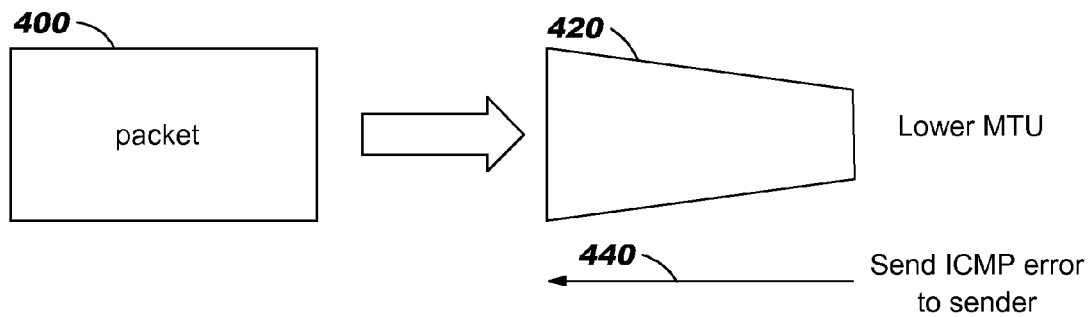
FIG. 4 provides a graphical illustration of a bottleneck situation that arises if a too-large packet is sent for outbound transmission.

FIG. 4 provides a graphical illustration of a bottleneck situation that arises if a too-large packet is sent for outbound transmission. In this illustration, the size of packet 400 does not initially exceed the MTU size of the entrance to a tunnel 420 or other receiver. However, a lower MTU size will be encountered before the packet reaches its destination, leading to a bottleneck in processing, where this constriction in MTU size is shown by the shape of graphic 420. As a result, the packet 400 is too large, and an ICMP error 440 is returned to the sender. The sender may be a TCP/IP stack of the operating system detecting the bottleneck, a TCP/IP stack of a virtual machine informed by a hypervisor, and so forth. The constriction and resulting bottleneck may be encountered irrespective of a router along the packet's path in the network. The constriction may be due, by way of example, to: the physical MTU size being lowered by an administrator and the operating system not dynamically detecting the lowered size; a guest operating system running in a VM which is set to always default to 1,500 bytes for the MTU size; the VM assuming that the default Ethernet MTU size should be used, but the device at the hypervisor actually having a lower MTU size; the network interface (in the operating system or the hypervisor) implementing a network tunnel (such as GRE, IPSec, virtual network, or network overlay) and adding an additional header, which then raises the MTU size over the physical MTU size that is available; or in a switched LAN, having different-sized MTU segments. In a token ring network, for example, the LAN may be formed of 4K and 16K rings. A situation may therefore arise where another ring might respond with a FRAME error if the target is on a ring with a lower MTU size (and in that case, the ICMP error is generated internally based on the layer 2 error received). Or in an Ethernet LAN, some segments may support jumbo-frames while other segments do not. Constriction may arise when using a Universal Serial Bus ("USB") to Ethernet Network Interface Card ("NIC"), in which case an MTU size of 1,488 bytes is needed at the NIC instead of the default 1,500 bytes. These examples are merely illustrative, and constriction may arise in other scenarios. Furthermore, it should be noted that while discussions herein refer to conveying information with an ICMP error message, an alternative embodiment may use a different message (including a message specifically defined with use with the present invention) to convey that packet size needs to be reduced, where this message may optionally specify a particular reduced size, and such alternatives are deemed to be within the scope of the present invention.

Figure 5:
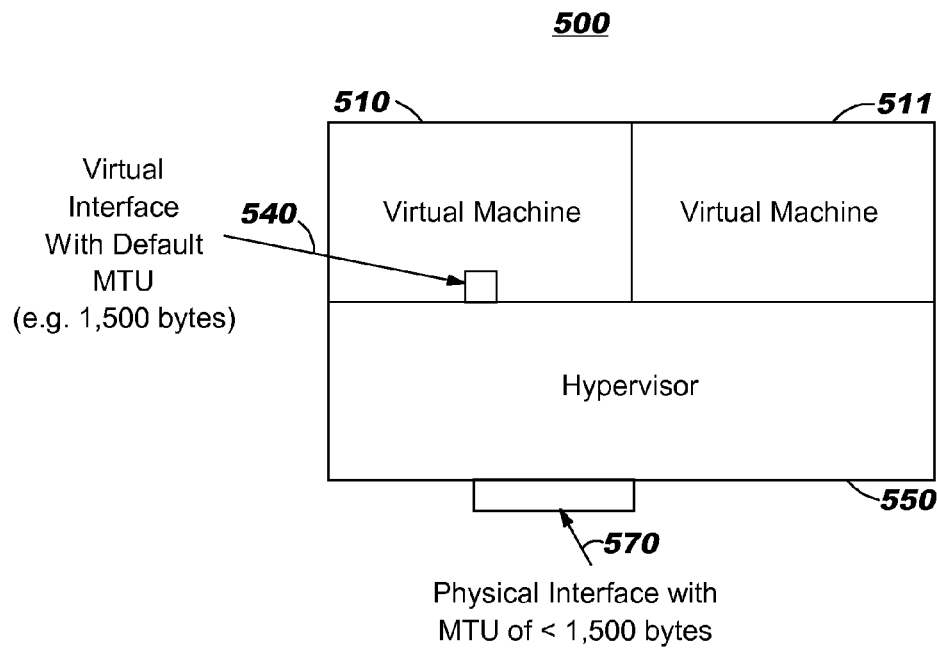
FIG. 5 illustrates MTU constriction in a virtual machine environment with a virtual interface.

FIG. 5 illustrates MTU constriction in a virtual machine environment 500 with a virtual interface, where this environment 500 includes virtual machines 510, 511 and a hypervisor 550, and is similar to the environment depicted in FIG. 3. In the example of FIG. 5, VM 510 and its virtual interface 540 may be configured to use a default MTU size (e.g., 1,500 bytes) while the physical interface 570 connected to hypervisor 550 uses a smaller MTU size (e.g., less than 1,500 bytes). The smaller MTU size may result from an administrator setting the size, or a USB-to-Ethernet device scenario as discussed above, etc. When this happens, the hypervisor cannot transmit the packet received from VM 510 without fragmenting it. The hypervisor will therefore send an ICMP error to the VM 510, irrespective of whether a "don't fragment" ("DF") bit has been set in the packet. When the networking stack of VM 510 receives this ICMP error, it will adjust its view of the MTU to the target address of the packet. The next packet will then be sized correctly, avoiding fragmentation.

Referring in particular now to a tunneling scenario, constriction may arise due to encapsulation of a packet for tunneling, whereby additional headers are added for the tunneling protocol. Tunneling may be desired for various reasons, such as enhanced security or for network virtualization (which is not to be confused with the virtualized computing systems discussed above with reference to FIGS. 1-2). In the presence of tunneling, the standard 1,500 byte MTU size for the link layer cannot be used, because the tunneling headers may cause the resulting packets (which have already been processed by the protocol stack 330) to exceed 1,500 bytes. Tunneling scenarios will now be discussed with reference to FIGS. 6 and 7.

Figure 6:
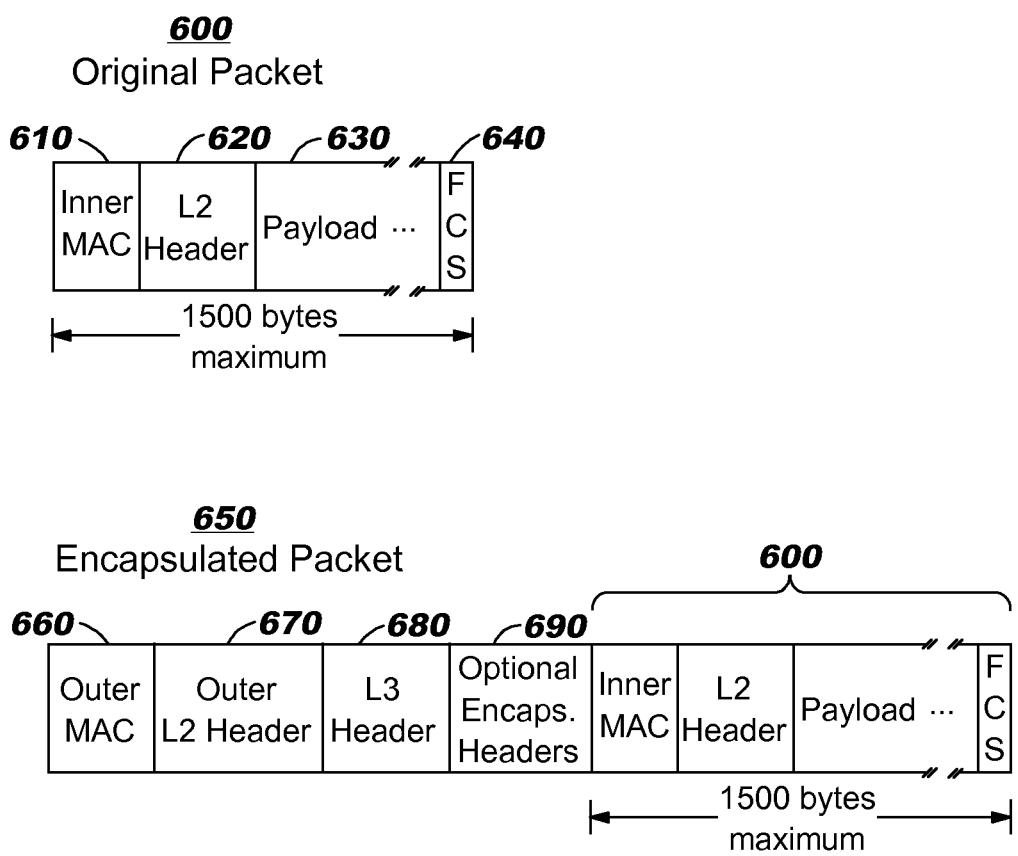
FIG. 6 illustrates a data packet processed by a protocol stack, and a version of the data packet that may result from encapsulating the packet for transmission in a tunneling environment.

Referring first to FIG. 6, where an original packet 600 and an encapsulated packet 650 are illustrated. These sample packets will now be discussed. (It will be understood that the illustrated packet formats in FIG. 6 are simplified for purposes of discussion.)

Original packet 600 contains some amount of payload 630, to which a Layer 2 header 620 has been added for network transmission. The Layer 2 header may contain, by way of example, an IP header, and may contain the MAC address of the source and destination for the packet. An inner MAC address field 610 is also illustrated, and provides increased efficiency for packet forwarding. A frame check sequence number field 640 is also shown. The size of original packet 600 will be constrained to the MTU size, which is 1,500 bytes in the example, to avoid triggering packet fragmentation responsive to the "packet too large" error message generated at a network router, as has been discussed above.

Encapsulated packet 650 depicts additional headers that may be added to original packet 600 for purposes of tunneling. In this example, an outer MAC field 660 and outer Layer 2 header 670 are added, along with a Layer 3 header 680. The Layer 3 header 680 may be, by way of example, a TCP or UDP header, and may contain an IP address of the source and destination for the packet. Optional encapsulation headers 690 may also be added, and contain values that are specific to the tunneling protocol. Encapsulated packet 650 also contains the original packet 600. As will be obvious, if original packet 600 was already at or near the MTU size, the addition of the various headers 660-690 will likely cause the packet to become too large. Sending such packet into the network will then trigger the path-MTU error and resulting packet fragmentation discussed above.

Embodiments of the present invention are directed to avoiding the situation where a too-large packet is detected within the network path, thus necessitating packet fragmentation. Rather than allow such large packets into the network, an embodiment of the present invention evaluates the packet size at an endpoint of an outbound tunnel 390 (or other endpoint, when tunneling is not in use) from a sending computer system 301, allowing the tunnel endpoint to detect when addition of tunneling headers has caused packet size to exceed the MTU size. The payload size can then be reduced, so that packets sent into the network on the tunnel will not trigger the path-MTU error and fragmentation processing discussed above.

In a virtualized environment, the tunnel endpoint may correspond to the hypervisor 350—that is, the encapsulation of a message 600 and addition of headers 660-690 for purposes of tunneling may be done in the hypervisor. Or, the tunnel processing might be done in the physical adapter. The processing with the hypervisor and within the physical adapter are both "invisible" to the logical partition, and placing code which implements an embodiment of the present invention in either the hypervisor of the adapter avoids having to modify the logical partitions 310, 311. This enables using a default image for the logical partitions, which improves interoperability and increases automation.

Referring now to FIG. 7, tunneling in a virtualized operating system environment is depicted at 700, whereas tunneling in a non-virtualized operating system is depicted at 730. VMs 710, 711 send packet data to hypervisor 720, and these packets may use the default Ethernet MTU size of 1,500 bytes. A bridge 721 of the hypervisor receives the packets. A packet may be of suitable size when forwarded directly from bridge 721 to a NIC 723. However, if tunneling will be used, bridge 721 forwards the packet to a tunnel endpoint, which is represented by FIG. 7 by tunnel module 722. Tunnel module 722 adds tunneling headers and then forwards the encapsulated packet to a NIC 724, and addition of these packet headers for tunneling may cause the packet to exceed the physical MTU size supported by the NIC 724. See the illustrative original packet 750 and encapsulated packet 760, depicting addition of tunnel header 770. Thus, the packet that will be sent on the tunnel has now become too large, as has been discussed above in more detail with reference to packets 600, 650 of FIG. 6.

Similarly, in the non-virtualized operating system environment 730, the TCP/IP stack 731 of the operating system may create a network packet of default size. The packet may be of suitable size when sent directly to NIC 734. However, if tunneling will be used, OS 730 sends the packet to a tunnel module 732, which adds tunneling headers and then forwards the encapsulated packet to a NIC 733. Again, addition of packet headers for tunneling causes the packet to become too large for the physical MTU size of the NIC 733, as illustrated by original packet 750 and encapsulated packet 760.

An embodiment of the present invention in a virtualized operating system environment uses processing within a tunneling module of the hypervisor (such as tunneling module 722 of FIG. 7) to simulate a path-MTU error condition (and in a non-virtualized operating system environment, this processing is preferably performed within a tunneling module of the non-virtualized OS, such as tunnel module 732 of FIG. 7). The tunnel endpoint, according to embodiments of the present invention, does not drop the packet and does not fragment the packet when a too-large packet arrives. Instead, the tunnel endpoint creates an ICMP error to signal the arrival of the too-large packet, and this error is responded back to the packet's source IP address as the new destination (while the original destination address is used as the source address of the ICMP datagram). In response to receiving the ICMP error at the tunnel endpoint, the MTU size used by the protocol stack of a logical partition or operating system is automatically reduced. This automatic size reduction leverages existing functionality that is designed to respond to a path-MTU error message sent from a router, and does not require a systems administrator to reconfigure settings of the logical partition (or operating system) and/or its protocol stack.

Note that the upper layers of a protocol stack, such as TCP, do not know where a packet will flow—i.e., which route or interface it will use—and thus the protocol stack generally uses a default MTU size. If the packet then flows over a tunnel, the tunnel headers may cause the packet to become larger than the available MTU size as discussed herein. The ICMP error that is generated when the too-large packet is detected, according to an embodiment of the present invention, will cause the corresponding path for the target host to be marked with a lower MTU size. Thus, too-large packets will no longer be sent on this path by the protocol stack.

It may happen that the MTU size of a particular NIC is made smaller, for example by administrator action. Or, it may happen that an implementation includes a driver which cannot inform the upper layer of the real MTU size. In such cases, instead of dropping the packet or fragmenting it, the IP implementation is modified to generate the ICMP error, or to behave as if it has received one, thereby causing the MTU size for the target address to be lowered as has been discussed. Again, this is done irrespective of the DF flag being set in the packet.

Figure 8:
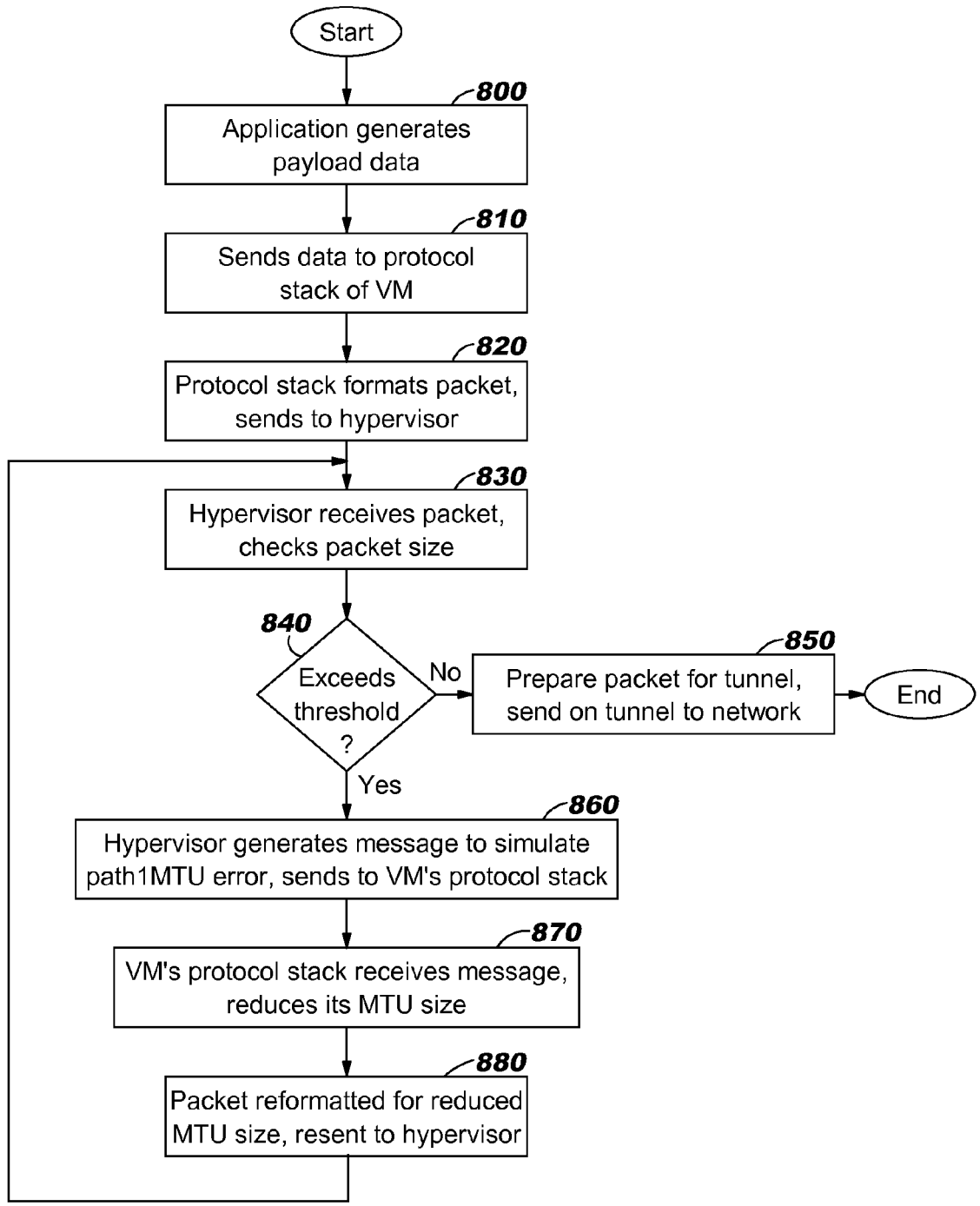
FIG. 8 provides a flowchart depicting logic which may be used when implementing an embodiment of the present invention.

Logic which may be used when implementing an embodiment of the present invention in a virtualized environment will now be discussed with reference to the flowchart in FIG. 8. (The manner in which FIG. 8 may be adapted for use in a non-virtualized environment will be obvious to those of ordinary skill in the art, given the teachings provided herein. For example, whereas the discussion of FIG. 8 refers to a hypervisor performing various operations, analogous operations may be performed by a tunnel endpoint in a non-virtualized environment, as can be seen by the illustrations at 722, 732 of FIG. 7.)

At Block 800, an application program executing within a logical partition generates application data which will be sent as the payload of one or more packets. This data is sent to the protocol stack of the virtual machine (Block 810), which formats the data into the one or more packets and sends each packet to the hypervisor (Block 820).

At Block 830, the hypervisor receives a packet from a logical partition and checks the packet size. (Various processing may also be performed on the packet, details of which are beyond the scope of the present invention.) In particular, this comprises determining whether addition of tunneling headers (illustrated generally at 660-690 of FIG. 6) will cause the packet size to exceed the layer 2 MTU size which is currently in use. Note that a tunnel endpoint is aware of the amount of data to be added for tunneling headers, while the logical partition and its protocol stack are not. Accordingly, the hypervisor can set a threshold value based on this knowledge, and Block 840 tests whether this threshold is exceeded. By way of example, suppose that a security tunnel requires 80 bytes of data on outbound packets, and that the current layer 2 MTU size is set to the default 1,500 bytes. The threshold value used at Block 840 is therefore 1,450 in this example. Or, in a scenario that does not add tunneling headers, the comparison at Block 840 uses the size of the packet as received by the hypervisor at Block 830.

If Block 840 determines that the threshold value is not exceeded, then Block 850 prepares the packet for the tunnel by encapsulation and addition of the needed headers, and then sends the resulting packet on the tunnel to the network. The processing of this outbound packet, which will not trigger a path-MTU error during network transmission, then ends.

When the test at Block 840 has a positive result, on the other hand, processing continues at Block 860. Referring to the above-discussed example where 50 bytes of data will be added for tunneling, the packet which is being processed might contain 1,480 bytes. Thus, the logical partition determined that the layer 2 MTU size of 1,500 was not exceeded, and allowed the packet to be sent to the hypervisor without fragmenting it first. However, addition of the tunneling headers will result in a packet size of 1,530, and a path-MTU error at a router would therefore result when using existing techniques. An embodiment of the present invention avoids this, and reformats the packet before it leaves the sending computer system. Accordingly, the hypervisor generates an ICMP message that simulates the path-MTU error condition, and returns this message to the protocol stack of the logical partition (Block 860). Notably, this ICMP error message generation is performed irrespective of the value of the DF bit in the packet. The ICMP error message will have its destination address and source address set to the values of the source address and destination address, respectively, of the too-large packet. (As one alternative, the IP address of a logical router could be used as the source address in the ICMP error message.) In a virtual machine environment, returning the ICMP error message at Block 860 preferably comprises placing the error message packet on the internal bridge or interface to ensure its delivery to the source virtual machine. In other cases, the ICMP error message packet is preferably inserted into the protocol stack so that it is handled as if it is an ICMP packet received from the network.

Upon receiving the path-MTU error message from the hypervisor, the protocol stack automatically reduces the MTU size that it will use (Block 870). This MTU size reduction leverages existing functionality that is designed to respond to a path-MTU error sent from a router (although in an alternative embodiment, newly-defined functionality that operates as disclosed herein may be used without deviating from the scope of the present invention). The existing functionality preferably stores the lowered MTU size in an OS routing table (or other relevant location), so that too-large packets will not be sent in the future. This existing functionality also automatically reformats the currently-processed packet (i.e., the packet that triggered the ICMP error) in view of the reduced MTU size, after which the reformatted packet is sent to the hypervisor (Block 880). Processing of FIG. 8 then returns to Block 830, where the hypervisor will receive this reformatted packet and check its size in view of the threshold (Block 840). It may happen that the reformatted packet continues to exceed the threshold, in which case processing will again reach Block 860. In that case, another path-MTU error condition will be simulated by the hypervisor, causing existing functionality of the logical partition's protocol stack to automatically make a further reduction in MTU size at Block 870. When the size of the reformatted packet does not exceed the threshold, processing will continue at Block 850 to prepare this packet for the tunnel and send the packet on the tunnel.

By way of example, if the protocol stack of the logical partition is using version 4 of ICMP, the message generated by the hypervisor at Block 860 is preferably a type 3 code 4, "fragmentation needed" message. A "Path MTU discovery" feature of the ICMP specification further indicates that a first reduction in the MTU size may be from 1,500 bytes to 1,492 bytes; if the resulting reformatted packet is still too large, then a second reduction is made to 1,006 bytes, and so forth. Because this step-wise reduction is a standard feature of existing protocol stacks, an embodiment of the present invention does not need to provide additional code for reducing the MTU size.

Note that the type 3 code 4, "fragmentation needed" message of ICMP version 4 also conveys that a "don't fragment" bit is set in the too-large packet. This bit setting is designed to prevent the router from performing its own fragmentation and then forwarding the newly-created smaller packets on through the network (instead of generating the path-MTU error). This type of fragmentation is deemed to be undesirable because it places a requirement for packet reassembly on the packet receiver—i.e., at the target host. (In addition, version 6 of ICMP expects all fragmentation to be done at the transmitting system, and not in intermediate nodes of the network.) To avoid router-based fragmentation, the "don't fragment" bit is conventionally set to "on", which will cause the router to drop the packet when it returns the path-MTU error. An embodiment of the present invention operates irrespective of the setting of the "don't fragment" bit.

Examples of tunneling scenarios in which an embodiment of the present invention may be used include Internet Protocol Security ("IPSec") tunnels and Generic Routing Encapsulation ("GRE"). Tunneling-type encapsulation may also be performed in a network virtualization environment, whereby tunnels are used to provide a logical structure for a network that differs from the physical network structure.

Figure 9:
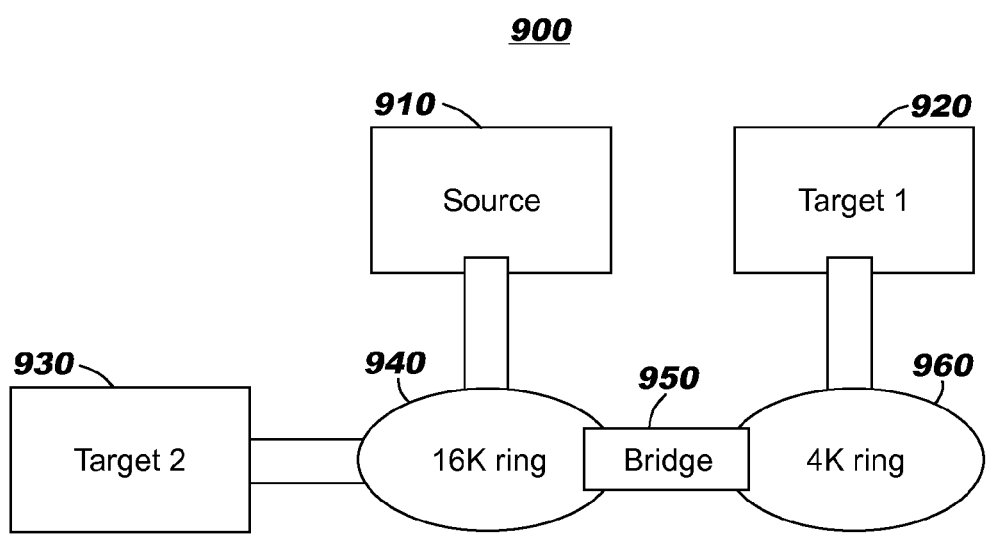
FIG. 9 illustrates MTU size constriction in a token ring environment.

Referring now to FIG. 9, MTU size constriction in a token ring environment will now be discussed in more detail. In the sample environment 900, a 16K ring 940 is bridged 950 to a 4K ring 960, which results in MTU size constriction for packets that are sent from source 910 to target 1 920. Source 910 may successfully transmit a packet to the 16K ring 940, but MTU size constriction is encountered in layer 2 of bridge 950 when the packet reaches the ring boundary. That is, bridge 950 detects a frame size mismatch that prevents sending the packet to the 4K ring 960. Bridge 950 will therefore generate an error message for sending to the source 910. This error message will be a layer 2 frame error, and will indicate the (smaller) MTU size to be used for reaching the target 1 920. An embodiment of the present invention preferably converts this error message to an ICMP message in a driver, and sends this ICMP message to a driver at source 910 which inserts the ICMP error into the protocol stack of source 910. The protocol stack may be implemented such that it records a host route with the resultant MTU size to use on that route. Accordingly, only those nodes on the ring that has the smaller MTU size will be recorded in association with the lower MTU size, and smaller packets will be sent to those nodes. Packets sent to nodes on the ring with larger MTU size, such as target 2 930, do not require formatting at the lower MTU size. That is, source 910 can continue to send packets as large as 16K to target 2 930, even though source 910 will not send packets larger than 4K to target 1 920.

In view of the disclosures provided above, it can be seen that an embodiment of the present invention reduces packet fragmentation, and in particular, avoids fragmentation that results from sending too-large packets into the network in environments that include packet tunneling, VM to hypervisor constriction, varied MTU sizes among segments in a LAN, and combinations of these.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method comprising:
by computer program instructions on a computing device, wherein the computing device is a hypervisor in a virtualized computing environment:
receiving a packet prepared for transmission over a communication link to a network, wherein data values to be added by the computing device are absent from the prepared packet;
determining whether to transmit the received packet over the communication link based on whether a size of the received packet exceeds a threshold, wherein the threshold accounts for the data values to be added by the computing device in view of a maximum packet size for packets prepared for transmission to the network; and
in response to determining that the size of the received packet exceeds the threshold, determining not to send the received packet over the communication link including generating a simulated error condition and sending an error message to a preparer of the received packet, the error message adapted to automatically cause the preparer to reformat payload data of the packet into a smaller-sized packet and then send the smaller-sized packet to the computing device for transmission to the network.

2. The method according to claim 1, further comprising:
responsive to determining that the size of the received packet does not exceed the threshold, adding the data values to the received packet to create a tunnel packet and sending the tunnel packet over the communication link for transmission to the network.

3. The method according to claim 1, wherein the preparer is a protocol stack.

4. The method according to claim 1, wherein a size of the smaller-sized packet is determined by existing functionality of the preparer.

5. The method according to claim 1, wherein the maximum packet size is a link layer maximum transmission unit (MTU) size.

6. The method according to claim 1, wherein the tunnel is an Internet Protocol Security (IPSec) tunnel.

7. The method according to claim 1, wherein the computing device is partition management firmware in a virtualized computing environment.

8. An apparatus comprising:
a computer comprising a processor and a computing device, wherein the computing device is a hypervisor in a virtualized computing environment; and
instructions that when executed by the processor cause the computing device to carry out the steps of:
receiving a packet prepared for transmission over a communication link to a network, wherein data values to be added by the computing device are absent from the prepared packet;
determining whether to transmit the received packet over the communication link based on whether a size of the received packet exceeds a threshold, wherein the threshold accounts for the data values to be added by the computing device, in view of a maximum packet size for packets prepared for transmission to the network; and
in response to determining that the size of the received packet exceeds the threshold, determining not to send the received packet over the communication link including generating a simulated error condition and sending an error message to a preparer of the received packet, the error message adapted to automatically cause the preparer to reformat payload data of the packet into a smaller-sized packet and then send the smaller-sized packet to the computing device for transmission to the network.

9. The apparatus according to claim 8, further comprising:
responsive to determining that the size of the received packet does not exceed the threshold, adding the data values to the received packet to create a tunnel packet and sending the tunnel packet over the communication link for transmission to the network.

10. The apparatus according to claim 8, wherein the preparer is a protocol stack of an operating system virtual machine in the non-virtualized computing environment.

11. The apparatus according to claim 8, wherein the maximum packet size is a link layer maximum transmission unit (MTU) size.

12. A computer program product comprising:
a computer-readable storage medium having computer readable program code embodied therein, wherein the computer readable storage medium is not a signal, the computer-readable program code when executed by a computing device causes the computing device to carry out the steps of:
receiving a packet prepared for transmission over a communication link to a network, wherein data values to be added by the computing device are absent from the prepared packet;
determining whether to transmit the received packet over the communication link based on whether a size of the received packet exceeds a threshold, wherein the threshold accounts for a maximum packet size for packets able to be transmitted on the communication link; and
in response to determining that the size of the received packet exceeds the threshold, determining not to send the received packet over the communication link including generating a simulated error condition and sending an error message to a preparer of the received packet without transmitting the packet on the communication link, the error message adapted to automatically cause the preparer to reformat payload data of the packet into a smaller-sized packet and then send the smaller-sized packet to the computing device for transmission to the network, wherein the computing device is a hypervisor in a virtualized computing environment.

13. The computer program product according to claim 12, wherein the size of the received packet exceeds the threshold due to maximum transmission unit (MTU) size constriction on a transmission path of the packet.

14. The computer program product according to claim 12, wherein the error message comprises an Internet Control Message Protocol (ICMP) error message.

15. The computer program product according to claim 12, wherein the maximum packet size is a link layer maximum transmission unit (MTU) size.

16. The computer program product according to claim 12, wherein the communication link is a Generic Routing Encapsulation (GRE) tunnel.

* * * * *